Dec. 16, 1952
L. DESCHAMPS
2,621,365
APPARATUS FOR PRESSURE MOLDING ARTICLES OF
PLASTIC MATERIAL, OF EDIBLE MATERIAL, AND
OF NONFERROUS METALS
Filed May 21, 1949
3 Sheets-Sheet 1
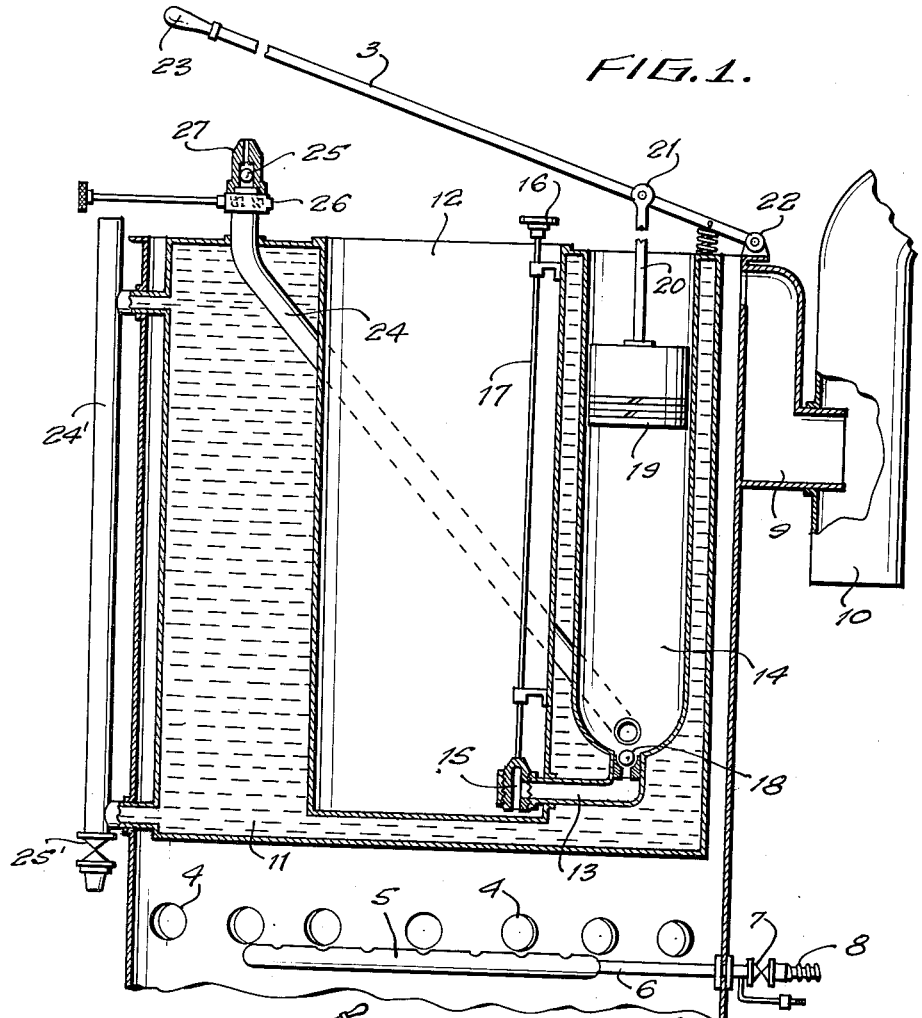
FIG.1.
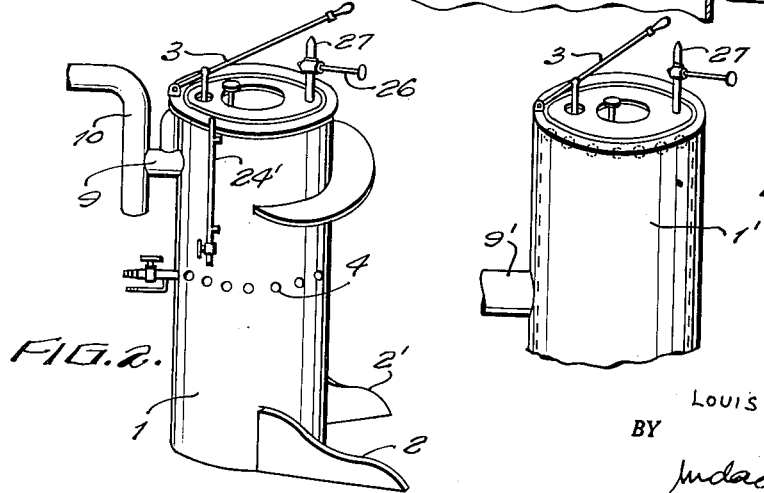
FIG.2.
FIG.3.
INVENTOR.
LOUIS DESCHAMPS
BY

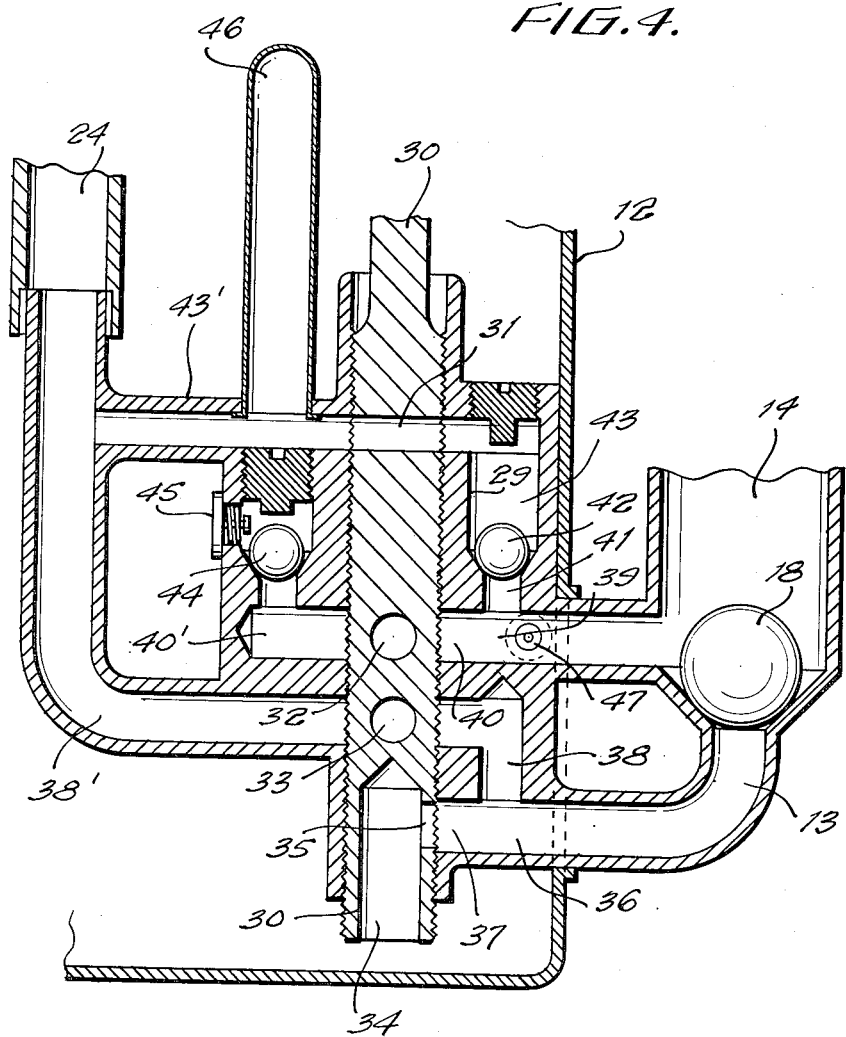

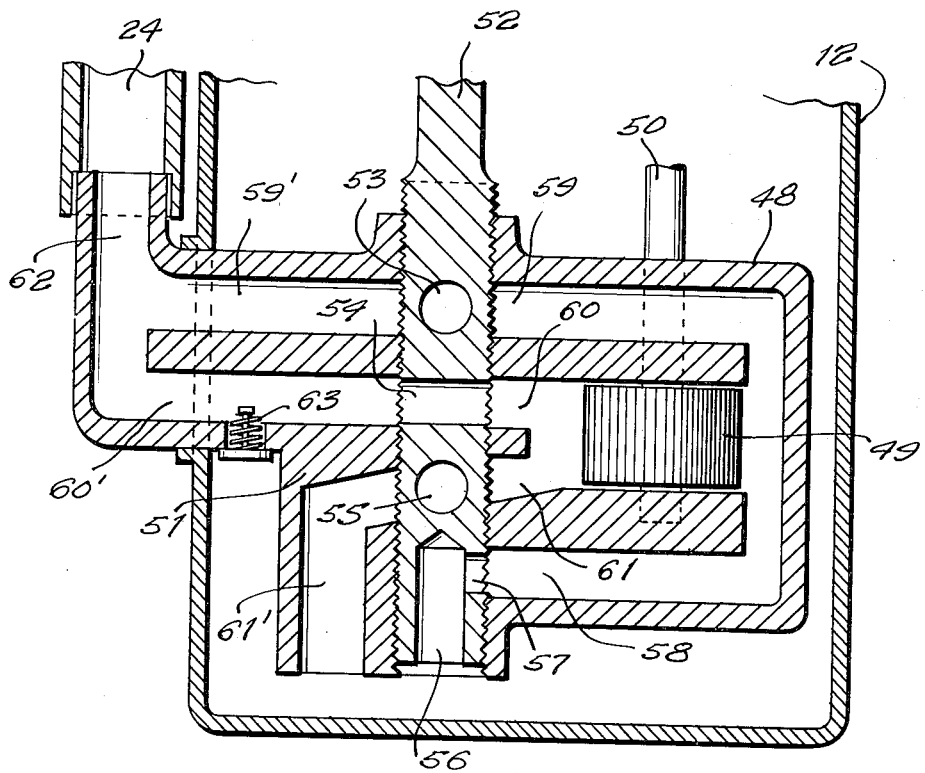

Patented Dec. 16, 1952

2,621,365

UNITED STATES PATENT OFFICE 2,621,365

APPARATUS FOR PRESSURE MOLDING ARTICLES OF PLASTIC MATERIAL, OF EDIBLE MATERIAL, AND OF NONFERROUS METALS

Louis Deschamps, Brussels, Belgium

Application May 21, 1949, Serial No. 94,712

4 Claims. (Cl. 18—30)

The present invention relates to an apparatus for pressure moulding articles of plastic material, of edible material, and of non-ferrous metals, of a simple construction and easily operated.

This apparatus is particularly suitable for moulding small articles of thermo-plastic material, such as Sunhite and the like.

It consists essentially of a reservoir for the material to be moulded, a cylinder with a hand-operated piston serving as a suction and force pump for drawing the material from the main reservoir and forcing it through a system of pipes, and a suitable nozzle, the whole being immersed in a heating bath, for example an oil bath heated by a gas burner, by electrical heating elements or any other heat source.

The bath is itself surrounded and supported by a casing containing the heating means and provided with an air intake and surrounded by a jacket in which the combustion products (fumes and/or burned gases) circulate and which ensures recovery of the heat from these products.

The apparatus may also be provided with temperature-regulating means.

The plastic material in the reservoir is softened by the heat and is withdrawn by the hand pump and forced into the mould held or secured to the end of the system of pressure pipes. Valves or non-return valves automatically controlled or not are fitted in the intake and discharge of the pump.

The same apparatus may be used for moulding edible products such as chocolate and the like.

It may equally well be adapted for the manufacture and pressure moulding of articles of non-ferrous metals such as zamac, zincuial or alloys of lead, tin, zinc and the like.

In this case the oil bath is replaced by a cyanide or like salt allowing the very high temperatures required to melt the metal or alloy to be injected, to be attained.

It is also possible to conceive an apparatus based on the same principles for injection or pressure moulding of articles of brass, bronze, aluminium and other similar non-ferrous metals by replacing the reservoir for the material to be moulded and the vat of the heating-bath by a graphite crucible and by providing the apparatus with a burner having a blast device and acting directly on the crucible. This latter would be arranged in such a manner that the pump with its system of pressure pipes must be immersed in the molten material, the metallic parts in contact with the latter being made of heat resistant non-oxidizable steel.

One form of the apparatus given as a non-limitative example is shown schematically in Figures 1, 2 and 3.

Fig. 1 is a schematic part-section of the apparatus.

Fig. 2 is a perspective view in elevation.

Fig. 3 is a part perspective view showing the arrangement of the combustion product heat recovering jacket.

Fig. 4 is an elevational sectional view of a valve assembly and a four-way valve according to an embodiment of the invention provided with a reciprocating pump; and Fig. 5 is an elevational sectional view of a four-way valve according to an embodiment of the invention provided with a continuous delivery pump.

The casing 1 is in the form of a vertical cylinder constituted by a curved iron sheet assembled by any suitable known means.

Its height is such that the casing being fixed on the ground the different controlling devices are conveniently located for the operator. It is provided at its base with two feet, 2 and 2' for stability in operation; to this end the two feet are arranged about 120° apart and each is placed 120° from the point corresponding to the perpendicular to the ground from the point of the lever 3 (described hereinafter) positioned on the upper side of the apparatus.

At two thirds of its height the casing 1 is pierced by a ring of holes 4 for admitting air to the gas burner 5 located at the same height within the casing.

This burner is fed by a piping 6 passing through the casing and terminating in a control-cock 7 having a rubber ferrule 8 by which it may be connected to the gas supply pipe. From the piping 6 and outside the apparatus may be diverted an outlet 28 allowing connection of a small nozzle serving to heat locally any part of the apparatus which becomes obstructed by solidified plastic material.

The upper part of the casing carries a conduit 9 for connection to an evacuation jacket. With a view to avoiding an excessive draught and preventing too rapid an evacuation of the heat developed by the burner it is advisable to discharge the conduit 9 into the system of vertical pipes 10 open at its lower end.

Where a heat recovering jacket 1' (Fig. 3) is provided this jacket completely envelopes the apparatus or at least the heated parts thereof but is arranged in such a way as to allow the supply of fresh air necessary for the operation of the gas burner 5. At a suitable level it is provided with a conduit 9' for exhausting the waste combustion products.

Inside the casing 1 and above the burner 5 is located a vat 11 filled with oil and constituting an oil bath. The cross-section of this vat is slightly less than that of the casing so that between the vat and the casing there is provided a sufficient space for the circulation of the hot gas. The vat 11 is equipped with a level tube 24' the upper end of which opens freely into the air and which carries at its lower end the waste cock 25'.

A temperature regulator acting upon the tap feeding the heater 5 may be immersed into the level tube 24'.

In the middle of the vat 11 is placed the reservoir 12 for the plastic or other material; a tube 13 opening close to the bottom of the reservoir 12 connects with the upper part of the cylinder 14 also immersed in the vat 11. Tube 13 is equipped at one end with a stop cock or valve 15 the opening and closing of which is controlled by a handle 16 disposed at the upper part of the apparatus and mounted on a shaft 17 fixed to the closing member of the said stop cock or valve and a ball valve 18 at the other end. The purpose and operation of the valve 15 which is disposed inside the reservoir 12 is described later.

The piston 19 coupled by means of the connecting rod 20 and the pivot 21 to the lever 3 may move in the cylinder 14.

The lower end of this latter pivots about a point 22 located on the upper part of the casing 1. The other end of the lever 3 which is to be gripped by the operator is provided with a handle 23. Below the cylinder but above the valve 18 is connected the system of pressure pipes 24 discharging at the upper part of the apparatus and terminating in a cock 26 provided with a threaded outlet socket. On this socket may be mounted as necessary, either a simple ferrule allowing connection of the mould, or a ferrule provided with a non-return valve 25.

In certain cases, notably when moulding hollow articles, after a certain period of time necessary for the partial solidification of the injected material, it is necessary to be able to run off the upper part of the material in the mould which remains fluid; to this end a simple ferrule 27 without a non-return valve is used.

It is precisely for this purpose that the valve 15 has been inserted in the tube 13. In fact, when, after compression and injection of the fluid material in the mould connected to the ferrule 27 of the cock 26, it is necessary for the purpose referred to above to withdraw a certain portion of the injected material this operation is effected by causing the piston 19 to move upwardly to a predetermined extent. Due to the suction created by the upwardly moving piston the plastic or other material contained in the mould will be withdrawn in such a way as to keep the valve 25 open and the valve 15 closed so that the withdrawal does not take place through the tube 13.

On the front face of the casing 1 is arranged a metal shelf on which may be kept a reserve of material to be moulded and the moulds, these being thus subjected to a pre-heating which is advantageous for the material and necessary with regard to the moulds.

The drawings and the foregoing description permit a ready understanding of the operation of the apparatus.

The mass of material melted by the effect of the heat communicated to it by its immersion in the oil-bath heated by the gas burner is drawn into the cylinder of the pump due to the depression caused by the upward movement of the piston which is hand-operated by means of a lever located on the upper part of the apparatus.

The non-return valve in the system of suction pipes of the pump allows a flow of the material to be moulded toward the cylinder but opposes any return of the said material.

In descending, the piston, under the effect of the pressure applied by the operator upon the lever, forces the fluid material through the system of pressure pipes to the mould connected to the end of these pipes. The non-return valve installed in this pipe system functions to allow the flow of material toward the mould and prevent any return of the material toward the cylinder when the latter is evacuated by the upward movement of the piston.

However, in certain cases it is necessary to be able to evacuate the system of pressure pipes particularly when, in making hollow moulded articles, a portion of the injected material is to be withdrawn from the mould.

The process and means necessary to this end have been sufficiently described above and it will be unnecessary to describe them again.

The vat containing the material to be moulded as well as the pump and its system of pressure pipes being immersed in the oil-bath, the same temperature prevails throughout the whole assembly thus removing any risk of coagulation or hardening of the material at any point in the circuit.

In addition the recovery of the heat given off by the combustion gases may be effected by the adjunction of a suitable jacket.

Other forms of the apparatus may also be conceived in which any of the following improvements may be provided.

1. In the case where a manually, mechanically or electrically controlled reciprocating pump is used comprising a cylinder 14 in which moves a piston 19 it is advantageous to provide this pump with a piston having a short travel, particularly when effecting the moulding of small articles, and to replace the cock or valve 15 as well as the injection head constituted by the members 25, 26 and 27 by the valve assembly described later.

2. The reciprocating pump initially envisaged may be replaced by a continuous-supply pump for example a geared pump, and in this case the suction valve 15 and the injection head (25, 26, 27) are replaced with advantage by a four-way valve of special type described later.

In both the above cases the pressure pipe 24 opening at the upper part of the apparatus is terminated in a simple ferrule allowing easy connection of the mould and injection of the material from the bottom to the top.

3. Independently of the heating means already defined the material to be moulded may be heated electrically or by any other suitable means.

4. The temperature regulator is preferably installed directly in either the oil-bath, the salt bath or the crucible as the case may be.

5. Certain materials susceptible to moulding by means of the apparatus according to the invention are fluid or liquid only at low temperatures and harden with heat. In order to treat such materials the oil-bath instead of being heated in any way may, on the contrary, be either cooled, for example, by circulating cold water through a tube-coil located in the bath, or may be refrigerated according to any of the usual known processes of refrigeration.

The material in this case is injected at a low temperature into the moulds where it solidifies the said moulds being heated to a suitable temperature either by the application of an electrical heating resistance or by preheating in a suitable oven or by any other convenient means.

It follows that the moulding of hollow articles from these materials is effected in the same manner as with materials treated when hot that is to say that the material coming into contact with the heated moulds is partially hardened and that it is possible at that moment to run off or withdraw the material remaining fluid inside the moulded article.

Suitable for treatment in this manner are, notably, thermo-setting plastic materials, biscuit dough which, injected whilst cold, is baked in the mould etc.

Figures 4 and 5 show as a non-limitative ex-example one form of a valve assembly and a four-way valve according to the invention.

The valve assembly shown in Fig. 4 is located at the bottom of the reservoir 12 (Fig. 1) and is joined to the suction and forcing pipes of the reciprocating pump 14 (Fig. 1).

It comprises a metal body 29, for example of non-oxidizable steel obtained by moulding, forging, stamping or any other suitable manufacturing process, and including a threaded shaft 30 pierced diametrally by the ducts 31, 32 and 33, ducts 32 and 33 being spaced 90° with respect to duct 31, and a longitudinal bore 34 opening at the side of the shaft into a duct 35 parallel to duct 31.

In the body 29 are hollowed out, drilled or manufactured; an aspirating duct 36 dividing into two branches, of which the first, 37, located at the lower part of the body corresponds to the duct 35 piercing the shaft 30 and the second 38 corresponds to the duct 33; a pressure duct also dividing into two branches of which one, 40, corresponds to the duct 32 piercing the shaft whilst the second branch 41 running perpendicularly to the first is controlled by a non-return ball valve 42 located at the bottom of a third duct 43 forming a right-angled elbow and corresponding to the duct 31 through the shaft 30. A safety-valve 47 opening into the reservoir 12 is placed at the entrance of the duct 39.

Beyond the shaft 30 the duct 38 extends to duct 38' connected with the pressure pipes 24; the duct 40 extends to duct 40' equipped with a ball valve 44 and a safety valve 45 which opens into the reservoir 12. The duct 40' terminates in a dead end; the duct 43 extends to duct 43' to discharge into the duct 38' connected to the pressure pipes 24.

From duct 43' is branched an air bell 46 functioning as a relief chamber.

The operation of the valve assembly is as follows:

The shaft 30 is operated by a rod passing upwardly through the reservoir 12 and terminating in a handle located at the upper part of the apparatus in a convenient position for the operator.

For moulding solid articles the shaft 30 is turned so that the ducts 37 and 43 communicate respectively with the ducts 34 and 43'. In this position of the shaft the ducts 38 and 40 are closed. The fluid material in the reservoir 12 is drawn by the pump through the ducts 34, 37, 36 and 13 and forced by the same pump through the ducts 39, 43, 31, 43' and the system of pressure pipes 24 to the end of which is connected the mould.

For hollow moulding, after having proceeded as described above the shaft 30 is turned a quarter of a turn (90°); in this new position, the ducts 37 and 43 are closed whilst the ducts 38 and 40 communicate respectively with the ducts 38' and 40'. The pump continues to operate and its suction is effective via the ducts 38 and 38' and its pipes 24 on the mould itself, connected to the latter pipes, and consequently withdraws that part of the material not already solidified, this material being ultimately returned by the pump to the reservoir 12 via ducts 39, 40 and 40', the valve 44 and the safety valve 45.

The safety valve 47 positioned at the entrance of the pressure duct 39 functions to relieve any fortuitous increase in the feeding pressure of the material.

In the form shown in Fig. 5 the reciprocating pump is replaced by a continuous delivery pump of the geared type. 49, is one of the gears of the pump and is carried by the axle 50 driven for example by a slow speed electric motor or by a motor equipped with a speed reducing arrangement not shown in the figure.

The four-way valve 51 replacing as mentioned above the cock or valve 15 and the injection head 25, 26, 27 joins with the geared pump and is connected to the latter by suitable disposed ducts or pipes. The assembly formed by the pump and the valve is positioned at the bottom of the reservoir 12 and consequently is completely immersed in the material to be moulded.

The four-way valve comprises a metal body 51, of non-oxidisable steel for example obtained by any suitable manufacturing process and a threaded shaft 52 pierced diametrally by ducts 53, 54 and 55 (the ducts 53 and 55 being spaced 90° with respect to the duct 54) and a longitudinal bore 56 discharging at the side of the shaft through a duct 57 parallel to the duct 54.

In the body of the valve are hollowed out, drilled or manufactured, a duct 58 connected with the lower part of the aspirating chamber of the pump 49, a duct 59 connected with the upper part of the said chamber and two ducts 60 and 61 connected with the compression chamber of the same pump.

The duct 58 corresponds with the duct 57 of the shaft 52 and, in a certain position of the latter, allows communication between the aspirating chamber of the pump and the reservoir 12 containing the molten material.

The duct 59 corresponds with the duct 53 piercing the shaft 52 and extends beyond the latter into a duct 59' and discharges into a receiver 62 connected to the system of pressure pipes 24.

The duct 60 corresponds with the duct 54 piercing the shaft 52 and extends beyond the latter to a duct 60' to discharge also into the receiver 62. A safety valve 63 is placed in the duct 60' in such a way as to discharge into the reservoir 12. Finally the duct 61 corresponds with the duct 53 of the shaft 52 and extends to 61' to discharge freely into the reservoir 12.

The assembly comprising the pump 48 and the four-way valve 51 operates in the following manner:

The shaft 52 is operable by means of a rod passing upwardly through the reservoir 12 and terminating in a handle positioned at the upper part of the apparatus.

For moulding solid articles the shaft 52 is turned so that ducts 58 and 60 communicate respectively with the ducts 56 and 60'. In this position of the shaft the ducts 59 and 61 are closed. The material in the reservoir 12 is drawn by the pump 48 through the ducts 56, 57, 58 and forced by the same pump through the ducts 60, 54, 60', 62 and the system of pressure pipes 24 at the end of which is connected the mould.

For moulding hollow articles after having proceeded as described above, the shaft 52 is turned through a quarter of a turn (90°); in this new position the ducts 58 and 60 are closed whilst the ducts 59 and 61 communicate respectively with the ducts 59 and 61'.

The pump 48 operating without interruption its suction is effective, after the above operation, via the ducts 59, 53, 59' and the pipes 24 on the mould itself connected to the end of the latter pipes and consequently the non-solidified portion of the material which is ultimately forced by the pump into the reservoir 21 via the ducts 61, 55 and 61'. The safety valve 63 functions to release any fortuitous increase in feeding pressure of the material.

Having now particularly described and ascertained the nature of my said invention and in what manner the same is to be performed, I declare that what I claim is:

1. Apparatus for pressure molding articles of plastic material, edible material and non-ferrous metals, including a pump having an intake port and an outlet port; a pipe assembly communicating at one end thereof with the outlet port of the pump and adapted to be connected at the other end thereof to a die or mold; a reservoir for the plastic or other material to be molded; operable valve means located at said one end of said pipe assembly and being movable from one position connecting the same with said outlet port of said pump permitting flow of material in the direction from said pump to said pipe assembly and blocking flow in the opposite direction, and another position connecting said pipe assembly with said intake port of said pump permitting flow of material from said pipe assembly to said pump and blocking flow in the opposite direction; and a temperature stabilized container for a fluid bath maintained at predetermined temperature surrounding said pump, pipe assembly, and reservoir to maintain the material therein at fluid temperature to allow free flow thereof from said reservoir to said mold.

2. Apparatus for pressure molding articles of plastic material, edible material and non-ferrous metals, including a pump having an intake port and an outlet port; a pipe assembly communicating at one end thereof with the outlet port of the pump and adapted to be connected at the other end thereof to a die or mold; a reservoir for the plastic or other material to be molded; operable valve means located at said one end of said pipe assembly and being movable from one position connecting the same with the outlet port of said pump permitting flow of material from said pump to said pipe assembly and blocking flow in the opposite direction and also connecting said intake port of said pump with said reservoir, and another position connecting said pipe assembly with said intake port of said pump permitting flow of material from said pipe assembly to said pump and connecting said outlet port of said pump with said reservoir permitting flow of material from said pump into said reservoir but blocking the flow in the opposite direction; and a temperature stabilized container for a fluid bath maintained at predetermined temperature surrounding said pump, pipe assembly, and reservoir to maintain the material therein at fluid temperature to allow free flow thereof from said reservoir to said mold.

3. Apparatus for pressure molding articles of plastic material, edible material and non-ferrous metals, including a pump having an intake port and an outlet port; a pipe assembly communicating at one end thereof with the outlet port of the pump and adapted to be connected at the other end thereof to a die or mold; a reservoir for the plastic or other material to be molded; operable valve means including a valve body being formed with four passages, the first of said passages connecting said outlet port of said pump with said pipe assembly, the second of said passages connecting said outlet port of said pump with said reservoir, the third of said passages connecting said intake port of said pump with said pipe assembly, and the fourth connecting said intake port of said pump with said reservoir, said four passages being arranged substantially in one plane and having portions extending parallel to each other, and a manually operable rotatable shaft extending in the plane of said passages normal to and through said parallel portions of the same so as to block said passages, but being formed with two pairs of passages extending normal to each other arranged at the points of intersection of said four passages with said rotatable shaft, the first pair of passages in said rotatable shaft permitting in one position of said rotatable shaft flow through said first and fourth passage in said valve means, and the other pair of passages in said rotatable shaft permitting flow through said second and third passage of said valve means in a position of said rotatable shaft turned an angle of 90° relative to said one position of said shaft and a temperature stabilized container for a fluid bath maintained at predetermined temperature surrounding said pump, pipe assembly, and reservoir to maintain the material therein at fluid temperature to allow free flow thereof from said reservoir to said mold.

4. Apparatus for pressure molding articles of plastic material, edible material and non-ferrous metals, including a pump having an intake port and an outlet port; a pipe assembly communicating at one end thereof with the outlet port of the pump and adapted to be connected at the other end thereof to a die or mold; a reservoir for the plastic or other material to be molded; operable valve means including a valve body being formed with four passages, the first of said passages connecting said outlet port of said pump with said pipe assembly, the second of said passages connecting said outlet port of said pump with said reservoir, the third of said passages connecting said intake port of said pump with said pipe assembly, and the fourth connecting said intake port of said pump with said reservoir, said four passages being arranged substantially in one plane and having portions extending parallel to each other, a first non-return valve arranged in said first passage of said valve body permitting flow only from said pump to said pipe assembly, a second non-return valve arranged in said second passage of said valve body and permitting flow of material only from said pump to said reservoir, a third non-return valve arranged in said fourth passage of said valve body and permitting flow only in the direction from said reservoir to said pump, and a manually operable rotatable shaft extending in the plane of said passages normal to and through said parallel portions of the same so as to block said passages, but being formed with two pairs of passages extending normal to each other arranged at the points of intersection of said four passages with said rotatable shaft, the first pair of passages in said rotatable shaft permitting in one position of said rotatable shaft flow through said first and fourth passage in said valve means, and the other pair of passages in said rotatable shaft permitting flow through said second and third passage of said valve means in a position of said rotatable shaft turned an angle of 90° relative to said one position of said shaft; and a temperature stabilized container for a fluid bath maintained at predetermined temperature surrounding said pump, pipe assembly, and reservoir to maintain the material therein at fluid temperature to allow free flow thereof from said reservoir to said mold.

LOUIS DESCHAMPS.

REFERENCES CITED

The following references are of record in the file of this patent:

UNITED STATES PATENTS

| Number | Name | Date |
| --- | --- | --- |
| 1,193,322 | Waltz | Aug. 1, 1916 |
| 1,362,978 | Winter | Dec. 21, 1920 |

FOREIGN PATENTS

| Number | Country | Date |
| --- | --- | --- |
| 19,489 | Great Britain | 1910 |
| 549,238 | Great Britain | Nov. 12, 1942 |